United States Patent
Bradley et al.

(10) Patent No.: US 7,325,168 B2
(45) Date of Patent: Jan. 29, 2008

(54) TRACE DATA SOURCE IDENTIFICATION WITHIN A TRACE DATA STREAM

(75) Inventors: Daryl Wayne Bradley, Cambridge (GB); Sheldon James Woodhouse, Stow-cum-Quy (GB); Andrew Brookfield Swaine, Cambridge (GB)

(73) Assignee: ARM Limited, Cambridge (GB)

( * ) Notice: Subject to any disclaimer, the term of this patent is extended or adjusted under 35 U.S.C. 154(b) by 567 days.

(21) Appl. No.: 10/715,394

(22) Filed: Nov. 19, 2003

(65) Prior Publication Data

US 2005/0039078 A1 Feb. 17, 2005

Related U.S. Application Data

(63) Continuation-in-part of application No. 10/635,920, filed on Aug. 7, 2003.

(51) Int. Cl.
*G06F 11/00* (2006.01)
(52) U.S. Cl. .......................... 714/45; 717/128
(58) Field of Classification Search ............... 714/45; 717/128
See application file for complete search history.

(56) References Cited

U.S. PATENT DOCUMENTS

| | | | |
|---|---|---|---|
| 6,021,261 A | 2/2000 | Barrett, Jr. et al. | |
| 6,470,388 B1 | 10/2002 | Niemi et al. | |
| 6,584,491 B1 | 6/2003 | Niemi et al. | |
| 6,665,821 B1 * | 12/2003 | Miyayama et al. | 714/45 |
| 6,918,065 B1 * | 7/2005 | Edwards et al. | 714/45 |
| 6,985,848 B2 * | 1/2006 | Swoboda et al. | 703/26 |
| 7,043,418 B2 * | 5/2006 | Swoboda et al. | 703/28 |
| 7,043,668 B1 * | 5/2006 | Treue et al. | 714/45 |
| 7,080,289 B2 * | 7/2006 | Swaine et al. | 714/45 |

FOREIGN PATENT DOCUMENTS

| | | |
|---|---|---|
| DE | 199 30 120 | 1/2001 |
| GB | 2 366 050 | 2/2002 |
| WO | WO 00/63777 | 10/2000 |

* cited by examiner

*Primary Examiner*—Emerson Puente
(74) *Attorney, Agent, or Firm*—Nixon & Vanderhye P.C.

(57) ABSTRACT

A trace data formatter 30 assembles trace data frames 50. These trace data frames 50 include bytes which may either serve to carry a trace data source identifier ID or trace data. A system being traced has multiple trace data sources 12, 14, 16, 18 and when the trace data source which is generating the current trace data stream changes then a trace data source identifier ID is inserted within the trace data stream.

39 Claims, 6 Drawing Sheets

DATAout1 = DATAout2 = DATAin
READYnIn = READYn1 / READYn2
VALIDout1 = VALIDin & ! mask1
VALIDout2 = VALIDin & ! mask2

@ Posedge clock
mask1 ⇐ (READYn2 & VALIDout 2)
&! (READYn1 & VALIDout 1)
mask2 ⇐ (READYn1 & VALIDout 1)
&! (READYn2 & VALIDout 2)

TRACE DATA SOURCE IDENTIFICATION WITHIN A TRACE DATA STREAM

This application is a continuation-in-part of application Ser. No. 10/635,920, filed Aug. 7, 2003.

BACKGROUND OF THE INVENTION

1. Field of the Invention

This invention relates to the field of data processing systems. More particularly, this invention relates to data processing systems including a plurality of trace data sources operable to generate individual trace data streams for diagnostic purposes.

2. Description of the Prior Art

It is known to provide data processing systems with trace data generating mechanisms. Examples of such systems are the Embedded Trace Macrocells designed by ARM Limited of Cambridge, England. Such trace mechanisms serve to monitor the data processing operations taking place and to generate a trace data stream indicative of the data processing operations occurring, such as which instructions are being executed, which data values are being manipulated. This trace data stream is then output (possibly after on-chip buffering) to a diagnostic tool to assist a designer/programmer in debugging the system.

As data processing systems increase in complexity it is becoming common to use system-on-chip designs which typically contain many different data processing elements each performing its own data processing operations and communication with the other data processing elements. As an example, a single integrated circuit may include a processor core, a digital signal processor and a memory system. Each of these elements can be separately subject to tracing and generate its own trace data stream. A problem with providing separate trace mechanisms for each trace data source is that separate inputs and outputs need to be provided for each trace data source in a manner that disadvantageously consumes pin count. Furthermore, the different trace data output formats of some protocols that are appropriate and/or necessary for some data processing elements can present difficulty in a combined data stream.

It is known to provide trace systems which include trace source identifiers within the trace data protocol. These systems include the trace source identifiers with each trace data packet assembled and output.

SUMMARY OF THE INVENTION

Viewed from one aspect the present invention provides apparatus for processing data, said apparatus comprising:

a plurality of trace data sources operable to generate respective individual trace data streams carrying trace data;

a trace data selector operable to select one of said individual trace data streams as a selected trace data stream for output; and a trace data formatter operable to format said selected trace data stream to form an output trace data stream, wherein said trace data formatter is operable to detect which of said individual trace data sources is selected by said trace data selector and to insert a trace data source identifier in said output trace data stream in response to a change of trace data source selected by said trace data selector.

The present invention provides a mechanism whereby trace data source identification is included within the output trace data stream in an efficient manner. In particular, the trace data source identifiers are inserted upon a trace data source change rather than with every trace data packet. Accordingly, a trace data analyser can assume that the trace data source remains unchanged until a new trace data source identifier is encountered within the output trace data stream. This saves space within the output trace data stream, which can be limited due to storage, bandwidth, or other constraints.

In order that the trace data formatter can identify the trace data sources of the individual trace data streams, preferred embodiments of the invention are ones in which the selected trace data stream includes a trace data source identifier with every packet of trace data. Thus, the trace data formatter is able to track changes in the trace data source and format the output trace data stream with the appropriate inserted trace data source identifiers as required to indicate changes in the trace data source.

Whilst it might be possible to produce embodiments in which the trace data source identifiers are inserted at an arbitrary position within the output trace data stream, preferred embodiments insert such trace data source identifiers at predetermined points within the output trace data stream if a change occurs. Constraining the locations at which trace data source identifiers may be inserted has practical and decoding advantages whilst not unduly compromising the ability of the output trace data stream to efficiently provide trace data information in a compressed form.

In order to save space within the output trace data stream preferred embodiments utilise the predetermined positions where trace data source identifiers may be inserted as locations for trace data when a change in trace data source does not occur and an identifier is not required.

Whether such a predetermined position includes a trace data source identifier or trace data may itself preferably be indicated by a flag at a predetermined flag position within the output trace data stream.

It will be appreciated that since the predetermined positions at which trace data source identifiers may be inserted are at least partially constrained in preferred embodiments, an improvement in the efficiency of the system can be achieved by use of a position flag to indicate where trace data corresponding to a trace data source identifier starts within the output trace data stream. This flexibility in the relative position of the start of the trace data compared to its corresponding identifier avoids the need for gaps which would otherwise be unused in the output trace data stream.

Since the need to specify such a relative position occurs when a trace data source identifier is inserted, when such trace data source identifier is not inserted then the space used to indicate the relative position may be instead be used and to contain trace data.

The handling of the output trace data stream is advantageously simplified when it is ordered into data frames comprising a plurality of predetermined positions which can contain either trace data source identifiers or trace data and a plurality of predetermined positions containing trace data only.

Within such data frames a separate flag portion can be provided which is used to store the relative position information that indicates where trace data for the trace data source identified by the trace data source identifier starts within the output trace data stream, or alternatively to store trace data when trace data source identifiers are not present and so not requiring relative position information to be specified.

Preferred embodiments of the invention utilise reserved trace data source identifiers to serve as synchronisation values or null markers within the output trace data stream.

It will be appreciated that the output trace data stream may be output in real time from an integrated circuit or alternatively may be buffered on-chip on the integrated circuit.

Viewed from another aspect the present invention provides a method of generating trace data, said method comprising the steps of:

generating with a plurality of trace data sources respective individual trace data streams carrying trace data;

selecting one of said individual trace data streams as a selected trace data stream for output; and formatting said selected trace data stream to form an output trace data stream, wherein said formatting includes detecting which of said individual trace data sources is selected and inserting a trace data source identifier in said output trace data stream in response to a change of said selected trace data source.

Viewed from a complementary aspect the present invention provides apparatus for analysing trace data, said apparatus comprising:

a trace data receiver operable to receive an output trace data stream generated by an apparatus for data processing containing a plurality of trace data sources;

a trace data parser operable to parse said output trace data stream to detect a trace data source identifier within said output trace data stream; and trace data mapper responsive to a detected trace data source identifier to associate trace data within said output trace data stream with a trace data source of said apparatus for data processing as indicated by said detected trace data source identifier.

It will be appreciated that having generated a particular output trace data stream, a modified analysis tool for that trace data stream needs to be provided to decode the information specifying the trace data source. This trace data analysis tool may be provided in the form of special purpose hardware or an appropriately programmed general purpose computer.

DESCRIPTION OF THE PREFERRED EMBODIMENTS

Figure 1:
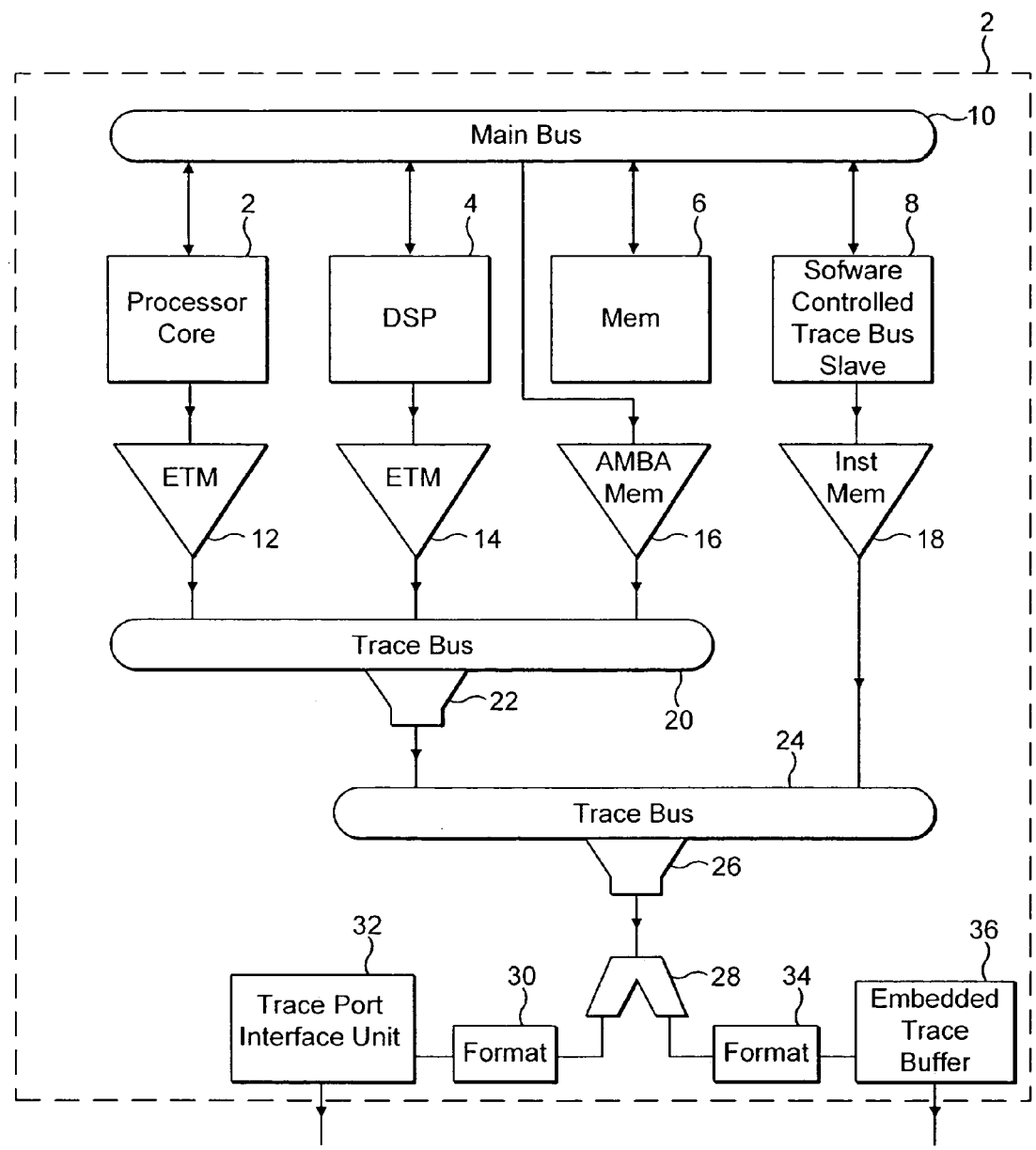
FIG. 1 schematically illustrates an integrated circuit including multiple trace data sources.

FIG. 1 shows an integrated circuit 2 in the form of a system-on-chip integrated circuit including a processor core 2, a digital signal processor 4, a memory 6 and a software controlled trace data slave 8 all connected via a main bus 10, such as an AMBA bus as designed by ARM Limited, Cambridge, England. Associated with each of the data processing elements 2, 4, and bus slaves 6, 8 is a trace data generator 12, 14, 16, 18 which is responsive to events and conditions occurring within the data processing element which they are monitoring to generate a trace data stream. The type of events being monitored will be familiar to those in the trace field, such as the instructions being executed, the data values being manipulated, data values being read or written to particular memory locations or the writing of a data value to a predetermined memory location serving as a trace output (e.g. the action of the software controlled trace slave is such that a data value written to a location within a predetermined address range is output as trace data so as to allow software being executed to be instrumented to output diagnostic data in the form of trace information).

The trace data streams that have been generated are output on a respective trace bus 20, 24 to a respective trace data stream combiner 22, 26. Each of the trace data sources 12, 14, 16, 18 is provided with a trace data bus and the associated trace data stream combiner 22, 26 acts as a multiplexer. The output of the trace data stream combiner 22, 26 is also in the form of a trace bus having the same signals.

As will be seen in FIG. 1, the trace data streams may be hierarchically combined, i.e. the first trace data stream combiner 22 combines the trace data streams from the trace sources 12, 14, 16 and the second trace data stream combiner 26 combines the trace data stream output from the first trace data stream combiner 22 with that output from the software controlled trace data generator 18.

A trace data stream replicator 28 serves to replicate the trace data stream output from the trace data combiner 26 into two initially identical trace data streams that are fed through different channels. The first of these trace data streams serves as a low-bandwidth output which is passed through a formatter 30 and a trace port interface unit 32 before being output off-chip in real time. A second of the trace data streams output from the trace data stream replicator 28 is output through a formatter 34 and then stored within an on-chip embedded trace buffer memory 36. Since this data is kept on-chip, it may be a high-bandwidth signal capturing a higher level of detail.

Figure 2:
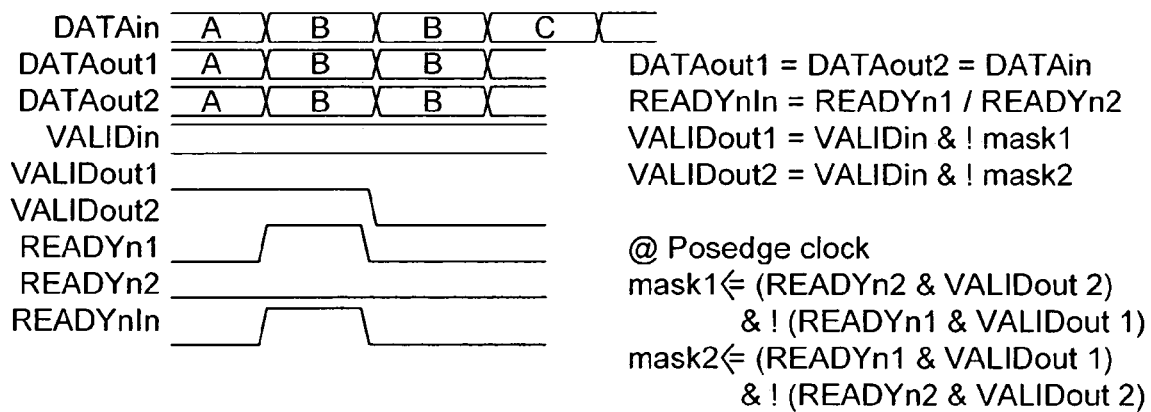
FIG. 2 schematically illustrates a trace data replicator.
Figure 2:
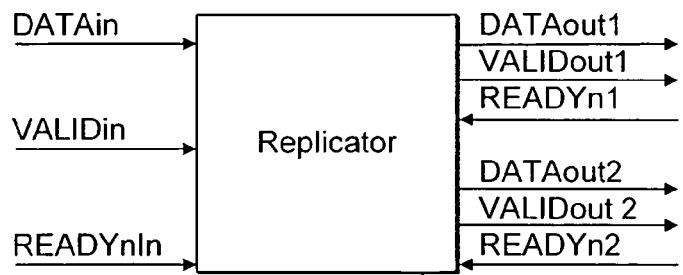

FIG. 2 schematically illustrates the operation of the trace data stream replicator 28. This receives a single trace data stream $DATA_{in}$ and generates two identical output trace data streams $DATA_{out1}$ and $DATA_{out2}$. The timing of the generation of these signals is controlled by an exchange of $READY_n$ and VALID signals as will be discussed later in relation to FIG. 4.

Figure 3:
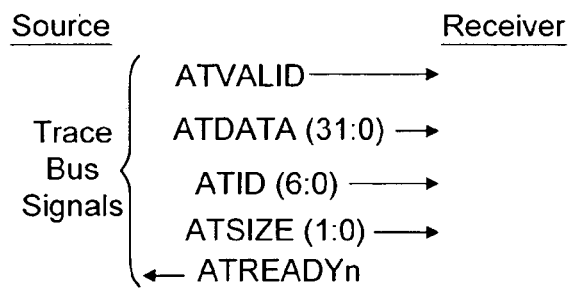
FIG. 3 illustrates a trace data bus.

FIG. 3 schematically illustrates the trace data bus 20, 24 in more detail. The trace data bus 20, 24 includes a valid signal ATVALID which indicates that the trace data source is outputting valid trace data and a trace data source ID onto the trace bus 20, 24. A 32-bit trace data signal ATDATA is generated by the trace data source and output on the trace bus 20, 24 to the trace data receiver. A 7-bit trace data source identifying signal ATID is generated by the trace data source and output on the trace bus 20, 24 to the trace data receiver. The trace bus 20, 24 also includes trace data size identifying signals ATSIZE which are generated by the trace data source and received by the trace data receiver and serve to indicate the data width upon the signals ATDATA. A two-bit size signal is provided and this may be used to specify how many bytes of the four bytes available on the 32-bit ATDATA portion of the trace bus 20, 24 are being used by the current trace data source. This size information is highly useful for the formatters 30, 34 which subsequently compress, or at least reformat the trace data stream.

A trace data receiver ready single ATREADYn is generated by the trace data receiver and output to the trace data source. In the context of the embodiment of FIG. 1, the trace data receiver may be either the trace data stream combiner 26 or the trace data stream combiner 22 or 28 (replicator), 32 (TPIU), 36 (ETB) whilst the trace signal sources may be any of the sources 12, 14, 16 and 18.

FIG. 3 illustrates that the trace data signals ATDATA and the trace source identifying signals ATID are provided with their own dedicated signal lines on the trace bus 20, 24. The provision of the trace source identifying signals as a separate portion on the trace bus 20, 24 frees the protocol and format of the trace data itself ATDATA from having to have embedded within it trace source identifying signals for use within a multi-source environment. This provides an advantageously modular and scaleable structure for supporting multi-source tracing.

Another feature of the provision of the trace data source identifying signals is that selective filtering or other processing may be performed upon the trace data stream in dependence upon the trace source data identifying signals. Thus, the formatters 30, 34 of FIG. 1 may selectively remove trace data associated with an "uninteresting" trace data source whilst maintaining trace data associated with a more critical trace data source in its full form. The trace data source identifying signals may be also used to insert appropriate trace data source identifying codes within a combined trace data output stream that is generated by the formatters 30, 34.

Figure 4:
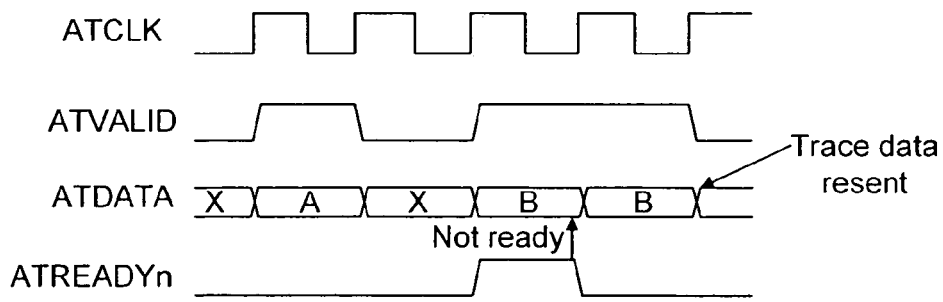
FIG. 4 illustrates the interaction between a valid signal, a data signal and a ready signal.

FIG. 4 schematically illustrates the action of the valid and ready signals in controlling the sending of trace data from a trace data source to a trace data receiver. A first trace data word A is sent and is indicated as being asserted upon the trace bus 20, 24 by the ATVALID signal going high. Whilst the trace data word A is being output the ATREADYn signal is low indicating that the trace data receiver is ready to receive that trace data word and accordingly that trace data word is successfully captured. Sometime later the trace data source tries to output a second trace data word B. At this time the ready signal ATREADYn is high and so this trace data word is resent in the following cycle by which time the ready signal has gone low and the trace data word B is successfully captured. Thus, a trace data receiver can effectively arbitrate between multiple trace data sources. Techniques for arbitrating between trace data sources, alternatively described as bus masters, will be familiar to designers of other system busses, for example a main bus 10. The trace data sources assume they will be able to send their trace data and assert it on their private trace bus to the trace data receiver. The trace data receiver indicates whether or not it was ready to receive that data using the ready signal. If the ready signal was not asserted LOW when the trace data was sent, then the trace data source resends the trace data.

Figure 5:
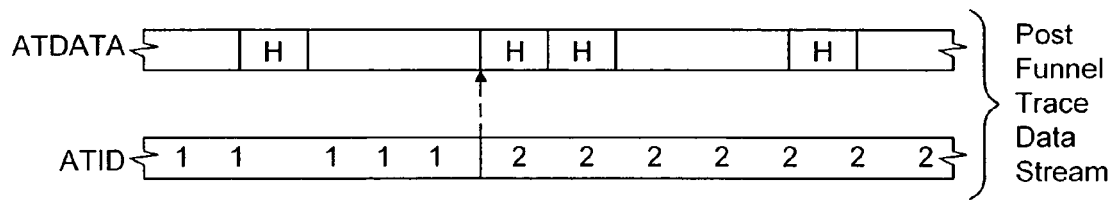
FIG. 5 schematically illustrates the relationship between a change in trace source identifying signal and the presence of header data within the trace data.

FIG. 5 schematically illustrates the relationship between trace data source identifying signals and header data within the trace data stream. As will be familiar to those in the tracing field header data is often inserted within a trace data stream to indicate parameters associated with the following trace data. This header data must be correctly identified within the trace data stream in order that it can be distinguished from trace data itself and properly decoded to be used in the subsequent decoding of the trace data. The correct identification of header data within a trace data stream is a problem within the tracing field. The present technique provides a system wherein whenever the trace data source identifying signal changes, a data header is inserted with a predetermined location relative to that change in trace data source identifying signal. In the example illustrated, the header is inserted at the point at which the trace data source identifying signal itself changes, although a fixed offset could be used instead. This simplifies subsequent processing of the trace data stream since by monitoring the trace source identifying signal for changes, header data can be identified in the trace data and accordingly properly decoded.

Figure 6:
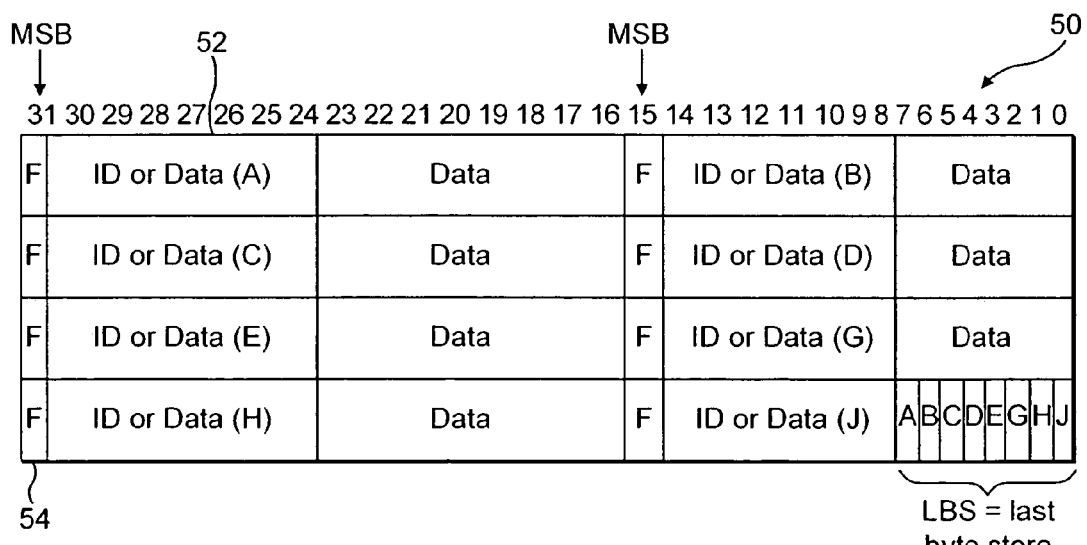
FIG. 6 schematically illustrates a frame of output trace data as generated by a trace data formatter.

FIG. 6 schematically illustrates an output trace data frame 50 as generated by the trace data formatter 30 as illustrated in FIG. 1. More particularly, this frame of output trace data comprises 128 bits of data arranged as 16 bytes. Starting with the first byte 52, alternate bytes within the trace data frame 50 may either contain a trace data source identifier ID or trace data. A flag 54 associated with each of these alternate bytes indicates whether a trace data source identifier ID or trace data is stored within that byte. The last byte within the data frame 50 is a last byte store LBS and serves to store one bit related to each of the bytes (i.e. alternate bytes) which may either be a trace data source identifier ID or trace data. If the respective byte is a trace data source identifier ID, then the corresponding bit within the last byte store LBS indicates whether the trace data associated with that trace data source identifier ID starts with the first following byte of trace data or with the second following byte of trace data. If the byte is a trace data byte rather than a trace data source identifier ID as indicated by the flag 54, then the most significant bit of that byte of trace data which has been displaced by the flag 54 is stored within a corresponding bit within the last byte store LBS. It will be appreciated that trace data source identifiers ID in the present example are 7-bit values and accordingly the eighth bit is available to serve as the flag 54 and the corresponding bit within the last byte store LBS can specify the relative position of the start of the corresponding trace data. Conversely, the trace data bytes themselves are 8-bit values and the most significant bit MSB of these trace data byte values is displaced 54 and resides within the corresponding bit within the last byte store LBS.

The trace data frame 50 of FIG. 6 shows that a trace data source identifier ID can be inserted whenever a change occurs in the trace data source. If a change does not occur, then no trace data source identifier ID need be inserted and the receiver of the trace data frame 50 assumes that the trace data source is as last specified. Preferred embodiments may serve to periodically insert a trace data source identifier ID even if no change has occurred as a way of allowing a stream of output trace data to be picked up at an arbitrary point and decoded on the basis that within a bounded time a trace data source identifier ID will be found enabling further trace data to be attributed to an appropriate trace data source.

In the output trace data frame 50 of FIG. 6, a flag 54 may be used to indicate whether or not a data sequence is standard trace data or a trace data source identifier. However, in an alternative arrangement the trace data source identifier inserted in the output trace data stream by the formatter 30, 34 may be distinguishable from the standard trace data in view of the fact that a reserved sequence known as an "escape sequence" is used as an identifier. The escape sequence is reserved in the sense that it is set aside exclusively for use as a trace source identifier so it should never occur as part of a standard trace data sequence directly associated with a trace data source on output by the formatter.

A single reserved sequence may be used for the plurality of trace data sources 2, 4, 6, 8 in which case a further source-specific ID is appended to the reserved sequence to form a complete trace source identifier. The formatter 30, 34 detects any occurrence of the reserved sequence in the standard trace data streams output by the trace data sources 2, 4, 6, 8. If a reserved sequence is by chance produced then the formatter 30, 34 modifies the standard trace data output by appending additional information to the detected sequence so that it no longer corresponds to a sequence reserved as a source identifier. This enables trace analysis tools to identify the sequence in question as standard trace data rather than erroneously associating it with a change in the selected trace data source. Thus the occurrence of a reserved sequence and further source-specific ID in the output of the formatter reliably signals a change in the trace data source.

Figure 7:
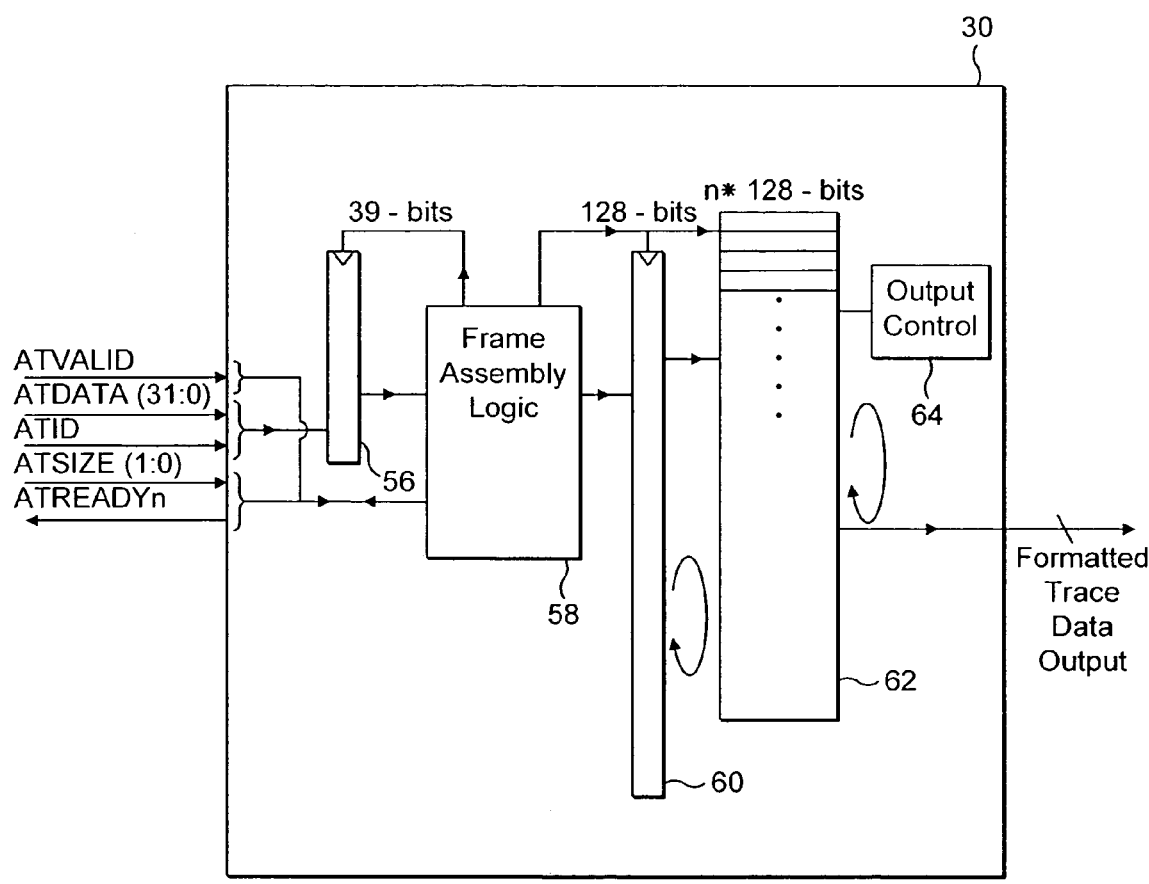
FIG. 7 schematically illustrates a trace data formatter.

FIG. 7 schematically illustrates a trace data formatter 30. This trace data formatter 30 receives a trace data stream from a trace data source 12, 14, 16, 18 via a trace bus 20, 24 as previously discussed. The trace data combiners 22, 26 perform the role of a trace data selector and serve to select between different trace data sources 12, 14, 16, 18 and output a selected trace data stream. The data on the output of the trace data combiner 22, 26 is a selected trace data stream. This selected trace data stream includes the trace data ATDATA, which is a 32-bit signal carrying data of a size specified by the ATSIZE signal, accompanied by trace source identifying signals ATID, which are a 7-bit value. Valid and ready signals also accompany the trace data and trace data source identifying signals on the trace bus 20, 24.

Within the trace data formatter 30 the trace data signals ATDATA and the trace data source identifying signals ATID are latched in a register 56. Frame assembly logic 58 is responsive to the valid ATVALID and size ATSIZE signals to read latched trace data ATDATA and trace source identifying ATID signals from the register 56 and assemble these into a 128 bit data frame store 60. The functional behaviour of the frame assembly logic 58 will be described later in relation to FIGS. 8 and 9.

At an overall level the frame assembly logic 58 is responsive to the trace source identifying signals ATID latched within the register 56 to detect if these have changed since the last trace data ATDATA was latched within the register 56. If the trace source identifying signals ATID indicate a change of trace data source 12, 14, 16, 18, then the frame assembly logic 58 inserts a corresponding trace data source identifier ID within the trace data frame 50 being assembled within the data frame store 60 at the point which has been reached within that data frame being assembled, subject to the required 16 bit alignment. Once a complete 128-bit data frame 50 has been assembled, then it is stored within a bank of 128-bit registers 62 which are written to in a round-robin fashion. The registers 62 are also read out in a corresponding round-robin fashion under control of an output controller 64 to form the formatted trace data output which is supplied to either an embedded trace buffer 36 or a trace port interface unit 32 as illustrated in FIG. 1. The action of the registers 62 is to serve as a ring buffer whereby trace data frames 50 may be stored into the ring buffer and trace data frames may be read out of the ring buffer in a manner seeking to avoid underflow or overflow and also providing for the formatted trace data output to have various bit widths as required by the particular embodiment.

It will be appreciated that the formatted trace data output including the embedded trace data source identifying signals will be decoded by a trace data source analysing apparatus. This apparatus may be a special purpose piece of hardware or an appropriately programmed general purpose computer. This trace data analyser serves to parse the output trace data stream it receives and is responsive to trace data source identifiers IOs embedded within that received output trace data stream. These trace data source identifiers IDs can then be used to map the corresponding trace data to the appropriate trace data source 12, 14, 16, 18 within the integrated circuit 2 under analysis. The trace data analyser is also responsive to synchronisation packets or null data packets embedded in the form of reserved trace data source identifiers (possibly accompanied by predetermined trace data values) within the output trace data stream to either initiate a synchronisation operation or to treat the output trace data stream as null until another identifier is received. The trace data analyser also reads and interprets the flags within the trace data frames 50 indicating whether a particular byte is a trace data source identifier ID or a trace data byte and the relative position bits or the displaced most significant trace data bits from the last byte store LBS which constitutes the last byte within the trace data frame 50.

An example of a trace data frame 50 which may be assembled by the trace data formatter 30 is given as follows:

EXAMPLE 2 trace sources, one with ID=0x03, one with ID=0x15 source with ID 0x03 outputs 0xaa, 0xa6, 0xa7, 0xa8, then source with ID 0x15 outputs 0x55, 0x52, 0x53, 0x54, then source with ID 0x03 outputs 0xca, 0xc6, 0xc7, 0xc8

MSB=most significant bit

If F=1 then byte x0 is an ID, MSB moved to byte J1 defines if byte in x1 corresponds to previous ID (1), or this new ID (0)

If F=0 then byte x0 is data, MSB of data in x0 is moved to byte J1

Last byte—LSB contains Am Bm Cm Dm Em Gm Hm Jm bits

The first ½ word A is constructed:

|   | A0 | A1 |
|---|---|---|
| F | ID or Data (A0) | Data (A1) |
| 1 | ID 0x03 | Data 0xaa |

F = 1, as A0 is ID
Am = 0 as 2$^{nd}$ byte A1 corresponds to the new ID

The second ½ word B is constructed:

|   | B0 | B1 |
|---|---|---|
| F | ID or Data (B0) | Data (B1) |
| 0 | Data 0x26 | 0xa7 |

F = 0 as B0 is data,
Bm = 1 as 1$^{st}$ byte of original B0 (0xa6) data is 1, the MSB stripped off and placed in Bm The third ½ word C is constructed:

|   | C0 | C1 |
|---|---|---|
| F | ID or Data (C0) | Data (C1) |
| 1 | ID 0x15 | Data 0xa8 |

F = 1 as C0 is ID
Cm = 1 as 2$^{nd}$ byte C1 corresponds to the previous ID 0x03

The forth ½ word D is constructed:

|   | D0 | D1 |
|---|---|---|
| F | ID or Data (D0) | Data (D1) |
| 0 | Data 0x55 | Data 0x52 |

F = 0 as D0 is data
Dm = 0 as MSB of D0 is 0

The fifth ½ word E is constructed:

|   | E0 | E1 |
|---|---|---|
| F | ID or Data (E0) | Data (E1) |
| 0 | Data 0x53 | Data 0x54 |

F = 0 as E0 is data
Em = 0 as MSB of E0 is 0

The sixth ½ word G is constructed:

|   | G0 | G1 |
|---|---|---|
| F | ID or Data (G0) | Data (G1) |
| 1 | ID 0x03 | Data 0xca |

F = 1 as G0 is a new ID
Gm = 0 as the data in G1 corresponds to this new ID 0x03

The seventh ½ word H is constructed:

|   | H0 | H1 |
|---|---|---|
| F | ID or Data (H0) | Data (H1) |
| 0 | Data 0x46 | Data 0xc7 |

F = 0 as H0 is data
Hm is 1 as MSB of original H0 was 1

The eighth 1/2 word J is constructed. Note that this includes the last byte of data associativity with an ID, and/or the data most significant bit (where the F bit indicates data)

|   | J0 | J1 |
|---|---|---|
| F | ID or Data (J0) | Data association/Data MSB Am Bm Cm Dm Em Gm Hm Jm |
| 0 | Data 0x48 | 0 1 1 0 0 0 1 1 |

F = 0 as J0 is data.
Jm is 1 as MSB of original J0 was 1.

J1 takes the most significant bits from x0 packets that are data, and data association from ID packets.

Bold bits on J1 correspond to ID association

Figure 8:
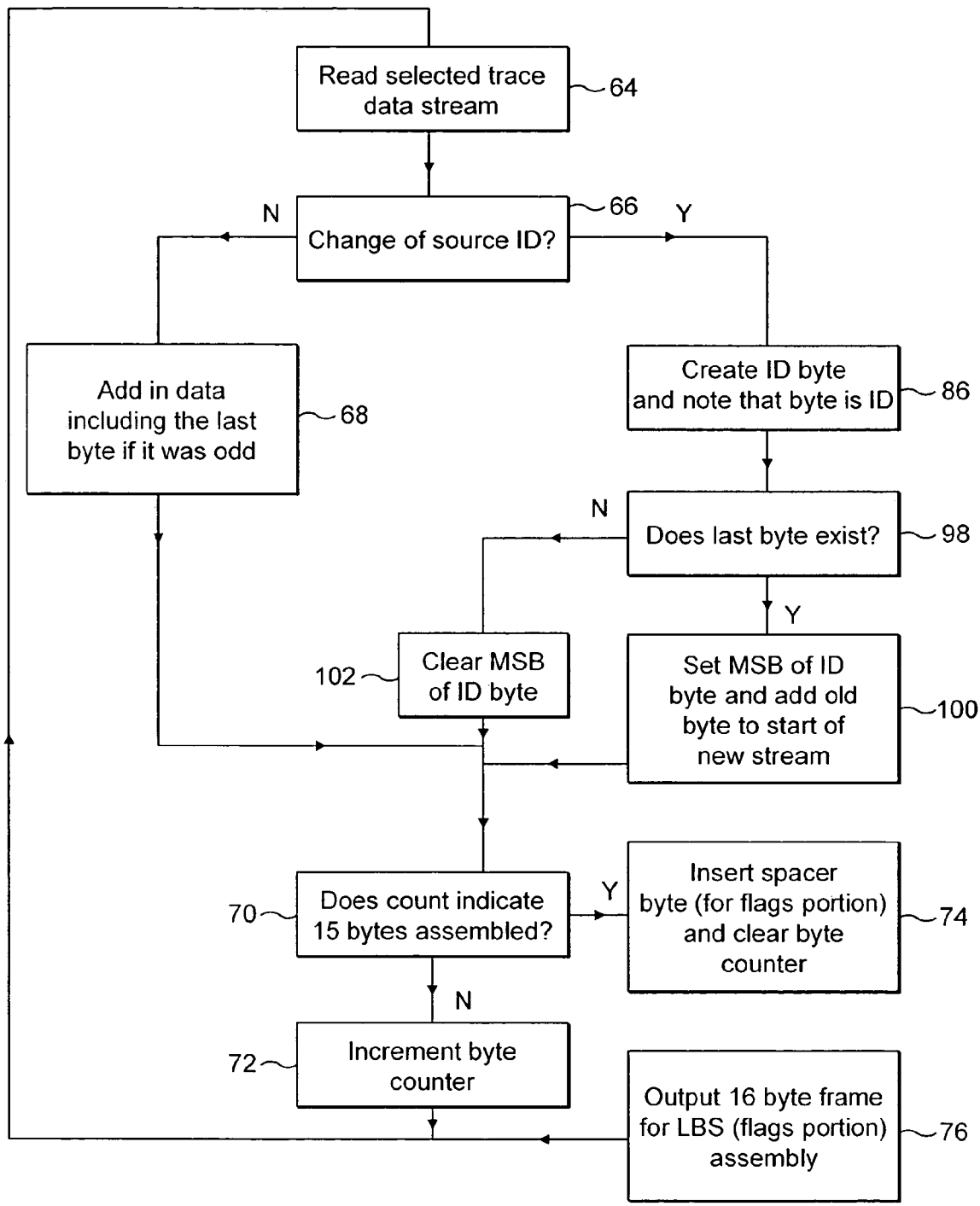
FIGS. 8 and 9 are flow diagrams schematically illustrating the functionality of the trace data formatter of FIG. 7.
Figure 9:
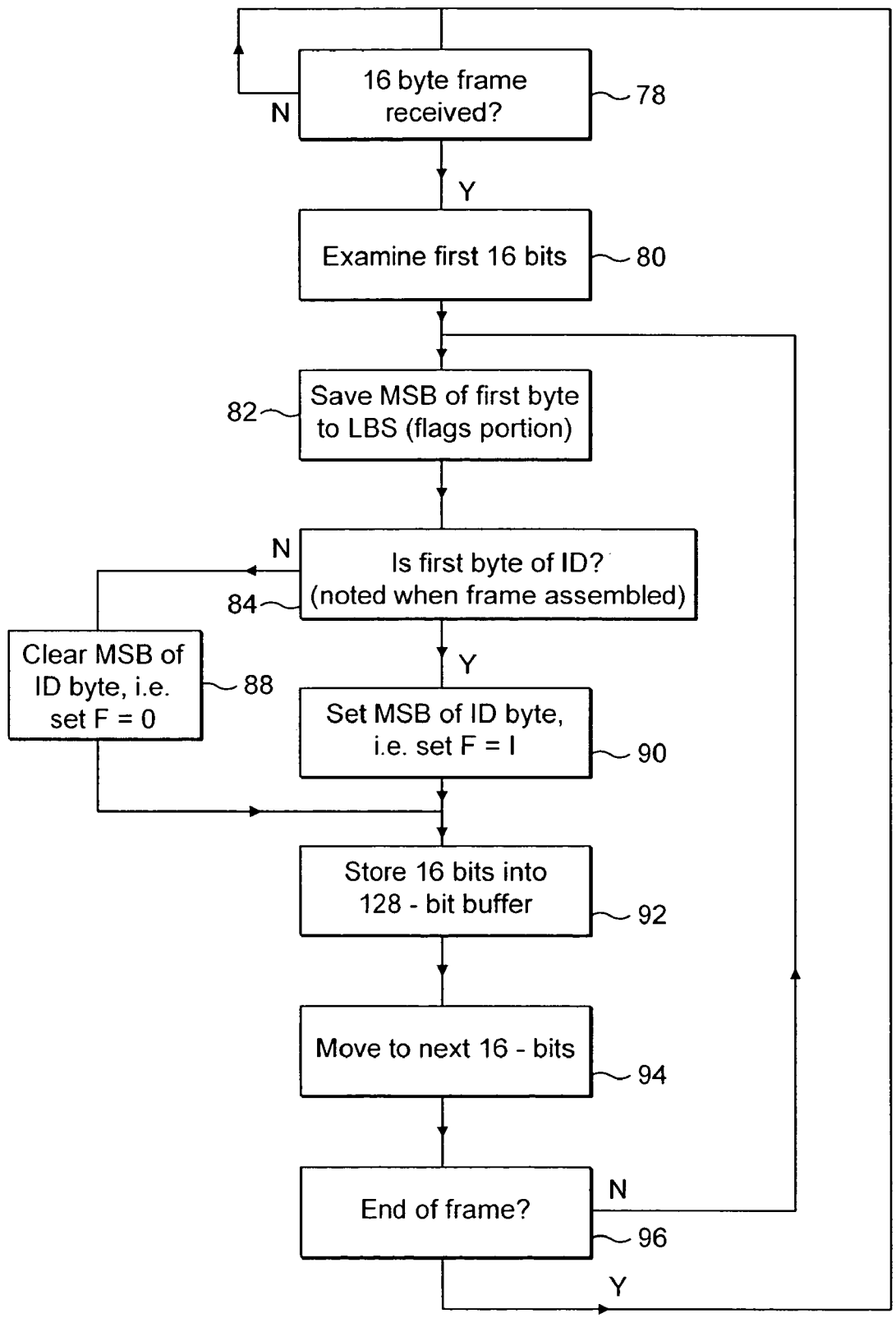

FIGS. 8 and 9 schematically illustrate the functional behaviour of the frame assembly logic 58 of FIG. 7. At step 64 the selected trace data stream as output by a trace data combiner/selector 22,26 is read. Step 66 determines whether there has been a change in the trace data source as indicated by the trace data source identifying bits ATID. If no change has occurred, then step 68 serves to add the trace data (of a size specified by the ATSIZE signals) to the current data frame being assembled. These trace data bytes can be added sequentially starting from the current position reached within the trace data frame 50 being assembled and using bytes which may either carry a trace data source identifier or a trace data byte to carry a trace data byte as it is reached or bytes dedicated to trace data. Step 68 also serves to write in as a trace data byte any last byte remaining pending from a previously received set of trace data stream signals, such as from a preceding trace data frame which was assembled and in which a section of trace data overhung the end of the trace data frame 50 and extended into the current trace data frame 50.

Step 70 checks whether a count of the current position within the data frame 50 being assembled has reached a value indicating that fifteen bytes have been assembled. If a count of fifteen has not yet been reached, then step 72 serves to increment the byte counter and return processing to step 54. If the end of the trace data frame 50 has been reached as indicated by a byte counter value of fifteen, then step 74 serves to insert a spacer byte which will serve as the last byte store LBS as will be discussed below. This last byte store may be considered as a flags portion of the trace data frame 50 which serves to carry flags indicating the relative position of trace data to its associated trace data source identifier or alternatively displaced bits of trace data which have been replaced by the flag values 54 elsewhere in the trace data frame 50. After step 74, step 76 serves to output a sixteen byte trace data frame 50 which is partially formed for further processing in accordance with the functions illustrated in FIG. 9.

FIG. 9 schematically illustrates how a partially formed sixteen byte trace data frame 50 is processed to assemble the last byte store LSB data. Step 78 waits for a sixteen byte trace data frame 50 to be received. Step 80 then examines the first sixteen bits of the received trace data frame 50. Step 82 saves to a corresponding position within the last byte store LBS the most significant bit MSB of the first byte of the 16-bit segment being examined. Step 84 then determines whether the first byte of the 16-bit segment being examined is carrying a trace data source identifier ID or trace data. This is determined from state stored in step 86 of FIG. 8. If the first byte is not a trace data source identifier ID, then the most significant bit MSB of this byte is set at step 88 to be "0" to indicate trace data. If the first byte of the 16-bit segment being examined does represent a trace data source identifier, then step 90 sets the most significant bit MSB of this byte to be an "1" to indicate that this byte is a trace data source identifier with the following 7-bits being trace data source identifier taken from the signals ATID.

At step 92 the modified 16-bit segment is stored into the appropriate position within the 128-bit buffer 60 and step 94 then moves to the next 16-bits to be examined. Step 96 determines whether the end of the trace data frame 50 has been reached. If the end has not been reached then processing returns to step 82. Conversely, if the end of the frame has been reached then processing returns to step 78 to await the next 16 byte partially formed trace data frame. The full assembled trace data frame may then be moved from the trace data frame store 60 to one of the registers of the register bank 62 as shown in FIG. 7.

If the result of the determination at step 66 was that a change of trace source has occurred, then processing proceeds to step 86 where a trace data source identifier byte is formed and inserted at the current position within the trace data frame 50 being assembled. The fact that the data at that position represents a trace data source identifier is also temporarily stored elsewhere this information is required in subsequent processing.

Step 98 determines whether there is a last byte overhanging from a previously captured set of trace bus signals which has not yet been placed into the trace data frame. If such an overhanging last byte exists, then step 100 serves to set the most significant bit within the byte holding the trace data source identifier to indicate that the trace data byte immediately following the trace data source identifier relates to the preceding trace data source and the trace data associated with the newly selected trace data source will commence within the output trace data stream one byte position spaced from the trace data source identifier itself. If the determination at step 98 was that such a last byte does not exist, then step 102 serves to set the most significant bit of the byte carrying the trace data source identifier to be a zero to indicate that the first byte of trace data corresponding to that new trace data source immediately follows the trace data source identifier. As will be explained later, these most significant bit values as set at steps 100 and 102 are relocated from these initial positions into a last byte store LBS 51 which forms the last byte within the trace data frame 50 so that the most significant bit positions within these bytes within the trace data frame 50 can be used by the flags 54 to indicate whether a trace data source identifier or trace data is being carried in one of these variable content slots within the trace data frame 50.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   a plurality of trace data sources operable to generate respective individual trace data streams carrying trace data;
   a trace data selector operable to select one of said individual trace data streams as a selected trace data stream for output; and
   a trace data formatter operable to format said selected trace data stream to form an output trace data stream, wherein said trace data formatter includes means for detecting which of said individual trace data sources is selected by said trace data selector and for inserting a trace data source identifier in said output trace data stream in response to a change of trace data source selected by said trace data selector, wherein said trace data formatter is operable to selectively insert or not insert said trace data source identifier in said output data stream in dependence upon said change of trace data source.

2. Apparatus as claimed in claim 1, wherein said trace data formatter is operable to insert said trace data source identifier at a predetermined source identifier position within said output trace data steam.

3. Apparatus as claimed in claim 2, wherein said predetermined source identifier position contains trace data when said trace data source identifier is not inserted.

4. Apparatus as claimed in claim 3, wherein a flag at a predetermined flag position within said output trace data stream indicates whether said predetermined source identifier position contains:
   (i) said trace data source identifier; or
   (ii) trace data.

5. Apparatus as claimed in claim 2, wherein when said predetermined source identifier position contains said trace data source identifier, then a further predetermined position within said output trace data stream contains a position flag indicating where trace data for said trace data source identified by said trace data source identifier starts within said output trace data stream.

6. Apparatus as claimed in claim 5, wherein when said trace data source identifier is not inserted, said predetermined source identifier position contains trace data and said further predetermined position contains trace data.

7. Apparatus as claimed in claim 1, wherein said output trace data stream is formatted into data frames, each data frame comprising:
   a plurality of predetermined positions respectively containing one of:
   (i) a trace data source identifier; and
   (ii) trace data; and
   a plurality of predetermined positions containing trace data.

8. Apparatus as claimed in claim 7, wherein each data frame includes a flags portion containing at least one of:
   (i) one or more position flags indicating respective start positions of trace data within said frame associated with trace data source identifiers within said data frame; and
   (ii) trace data.

9. Apparatus as claimed in claim 1, wherein said trace data formatter is operable to insert a trace data source identifier having a reserved synchronisation value as a synchronisation marker within said output trace data stream.

10. Apparatus as claimed in claim 1, wherein said trace data formatter is operable to insert a trace data source identifier having a reserved mill value as a null value marker within said output trace data stream indicative of said output trace data stream containing null values.

11. Apparatus as claimed in claim 1, wherein said output trace data stream is directed from said trace data formatter to one of:
   (i) one or more real time trace outputs of an integrated circuit; and
   (ii) a trace data buffer memory of an integrated circuit.

12. Apparatus as claimed in claim 1, wherein said trace data source identifier
   inserted in said output trace data stream by said trace data formatter comprises a reserved sequence that is distinguishable from any trace data sequences associated with said selected trace data stream in said output trace data stream.

13. Apparatus as claimed in claim 12, wherein said trace data formatter is operable
   to detect an occurrence of a trace data sequence corresponding to said reserved sequence in at least one of said individual trace data streams and upon detection of said reserved sequence, said formatter also being operable to modify said trace data sequence to distinguish it from said reserved sequence in said output trace data stream.

14. A method of generating trace data, said method comprising the steps of:
generating with a plurality of trace data sources respective individual trace data streams carrying trace data;
selecting one of said individual trace data streams as a selected trace data stream for output; and
formatting said selected trace data stream to form an output trace data stream, wherein said formatting step includes the steps of detecting which of said individual trace data sources is selected and inserting a trace data source identifier in said output trace data stream in response to a change of said selected trace data source, wherein said formatting includes selectively inserting or not inserting said trace data source identifier in said output trace data stream in dependence upon said change of said selected trace data source.

15. A method as claimed in claim 14, wherein said trace data source identifier is inserted at a predetermined source identifier position within said output trace data stream.

16. A method as claimed in claim 15, wherein said predetermined source identifier position contains trace data when said trace data source identifier is not inserted.

17. A method as claimed in claim 16, wherein a flag at a predetermined flag position within said output trace data stream indicates whether said predetermined source identifier position contains:
(i) said trace data source identifier; or
(ii) trace data.

18. A method as claimed in claim 15, wherein when said predetermined source identifier position contains said trace data source identifier, then a further predetermined position within said output trace data stream contains a position flag indicating where trace data for said trace data source identified by said trace data source identifier starts within said output trace data stream.

19. A method as claimed in claim 18, wherein when said trace data source identifier is not inserted, said predetermined source identifier position contains trace data and said further predetermined position contains trace data.

20. A method as claimed in claim 14, wherein said output trace data stream is formatted into data frames, each data frame comprising:
a plurality of predetermined positions respectively containing one of:
(i) a trace data source identifier; and
(ii) trace data; and
a plurality of predetermined positions containing trace data.

21. A method as claimed in claim 20, wherein each data frame includes a flags portion containing at least one of:
(i) one or more position flags indicating respective start positions of trace data within said frame associated with trace data source identifiers within said data frame; and
(ii) trace data.

22. A method as claimed in claim 14, wherein a trace data source identifier having a reserved synchronisation value is inserted as a synchronisation marker within said output trace data stream.

23. A method as claimed in claim 14, wherein a trace data source identifier having a reserved null value is inserted as a null value marker within said output trace data stream to indicate that said output trace data stream contains null values.

24. A method as claimed in claim 14, wherein said output trace data stream is directed to one of:

(i) one or more real time trace outputs of an integrated circuit; and
(ii) a trace data buffer memory of an integrated circuit.

25. A method as claimed in claim 14, wherein said trace data source identifier
comprises a reserved sequence that is distinguishable from any trace data sequences associated with said selected trace data stream in said output trace data stream.

26. A method as claimed in claim 14, wherein said formatting includes detecting an occurrence of a trace data sequence corresponding to said reserved sequence in at least one of said individual trace data streams and upon detection of said reserved sequence, modifying said trace data sequence to distinguish it from said reserved sequence in said output trace data stream.

27. Apparatus for analysing trace data, said apparatus comprising:
a trace data receiver operable to receive an output trace data strewn generated by an apparatus for data processing containing a plurality of trace data sources;
a trace data parser operable to parse said output trace data stream to detect a trace data source identifier within said output trace data stream; and
trace data mapper responsive to a detected trace data source identifier to associate trace data within said output trace data stream with a trace data source of said apparatus for data processing as indicated by said detected trace data source identifier, wherein said trace data source identifier is selectively inserted or not inserted in said output trace data stream by a trace data formatter of said apparatus for processing data in dependence upon a change of trace data source.

28. Apparatus as claimed in claim 27, wherein said trace data source identifier is inserted at a predetermined source identifier position within said output trace data stream when a change of trace data source occurs.

29. Apparatus as claimed in claim 28, wherein said predetermined source identifier position contains trace data when said trace data source identifier is not inserted.

30. Apparatus as claimed in claim 29, wherein a flag at a predetermined flag position within said output trace data stream indicates whether said predetermined source identifier position contains:
(i) said trace data source identifier; or
(ii) trace data.

31. Apparatus as claimed in claim 28, wherein when said predetermined source identifier position contains said trace data source identifier, then a further predetermined position within said output trace data stream contains a position flag indicating where trace data for said trace data source identified by said trace data source identifier starts within said output trace data stream.

32. Apparatus as claimed in claim 31, wherein when said trace data source identifier is not inserted, said predetermined source identifier position contains trace data and said further predetermined position contains trace data.

33. Apparatus as claimed in claim 27, wherein said output trace data stream is formatted into data frames, each data frame comprising:
a plurality of predetermined positions respectively containing one of:
(i) a trace data source identifier; and
(ii) trace data; and
a plurality of predetermined positions containing trace data.

34. Apparatus as claimed in claim 33, wherein each data frame includes a flags portion containing at least one of:
  (i) one or more position flags indicating respective start positions of trace data within said frame associated with trace data source identifiers within said data frame; and
  (ii) trace data.

35. Apparatus as claimed in claim 27, wherein a trace data source identifier having a reserved synchronisation value serves as a synchronisation marker within said output trace data stream.

36. Apparatus as claimed in claim 27, wherein a trace data source identifier having a reserved null value serves as a null value marker within said output trace data stream indicative of said output trace data stream containing null values.

37. Apparatus as claimed in claim 27, wherein said output trace data stream is read from one of:
  (i) one or more real time trace outputs of an integrated circuit; and
  (ii) a trace data buffer memory of an integrated circuit.

38. An apparatus as claimed in claim 27, wherein said trace data source identifier comprises a reserved sequence that is distinguishable from trace data originating from one of said plurality of trace data sources.

39. A computer program product comprising a computer readable storage medium carrying computer readable instructions that when executed are operable to control a computer to act as an apparatus for analysing trace data as claimed in claim 27.

* * * * *

UNITED STATES PATENT AND TRADEMARK OFFICE
CERTIFICATE OF CORRECTION

| | | |
|---|---|---|
| PATENT NO. | : 7,325,168 B2 | Page 1 of 1 |
| APPLICATION NO. | : 10/715394 | |
| DATED | : January 29, 2008 | |
| INVENTOR(S) | : Bradley et al. | |

It is certified that error appears in the above-identified patent and that said Letters Patent is hereby corrected as shown below:

In the Claims

Column 14, line 20 (claim 27, line 4):

"strewn" should read --stream--

Signed and Sealed this
Thirteenth Day of May, 2014

Michelle K. Lee
*Deputy Director of the United States Patent and Trademark Office*